(12) United States Patent
Kano et al.

(10) Patent No.: US 6,490,132 B1
(45) Date of Patent: Dec. 3, 2002

(54) TAPE CASSETTE HAVING FIRST AND SECOND WRITE INHIBIT MECHANISMS FOR CASSETTE TYPE DISCRIMINATION

(75) Inventors: Yasuaki Kano, Kanagawa (JP); Joichi Daiba, Aichi (JP); Yoshihisa Takayama, Kanagawa (JP); Takao Hiramoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/554,924
(22) PCT Filed: Sep. 27, 1999
(86) PCT No.: PCT/JP99/05262
§ 371 (c)(1),
(2), (4) Date: Aug. 22, 2000
(87) PCT Pub. No.: WO00/19429
PCT Pub. Date: Apr. 6, 2000

(30) Foreign Application Priority Data

Sep. 25, 1998 (JP) .............................. 10-271035
Sep. 25, 1998 (JP) .......................... 10-271648

(51) Int. Cl.⁷ ....................... G11B 23/087; G11B 15/07
(52) U.S. Cl. ...................................... 360/132; 242/344
(58) Field of Search ............................ 360/132, 60, 71; 242/344

(56) References Cited

U.S. PATENT DOCUMENTS 6,043,962 A * 3/2000 Abe et al. .................... 360/132

* cited by examiner

Primary Examiner—Jefferson Evans
(74) Attorney, Agent, or Firm—Ronald P. Kananen; Rader, Fishman & Grauer, PLLC

(57) ABSTRACT

This invention is directed to a tape cassette in which a tape body is wound across a pair of tape reels rotatably supported by the cassette body. At the cassette body, a location of a first write inhibit mechanism corresponds to the position of a write inhibit mechanism for another tape cassette. A second write inhibit mechanism is provided at the position that is not in correspondence with the position where write inhibit mechanism provided at the other tape cassette is provided. The first write inhibit mechanism is in a write inhibit state at all times. Thus, when there is loaded a tape cassette where recording of information signals is carried out by a different recording format into recording/reproducing apparatus corresponding to only a tape cassette of a specific recording format of tape cassettes different in the recording format, recording of information signals with respect to this tape cassette is inhibited to realize protection of already recorded data. Discrimination techniques are also disclosed.

4 Claims, 7 Drawing Sheets

TAPE CASSETTE HAVING FIRST AND SECOND WRITE INHIBIT MECHANISMS FOR CASSETTE TYPE DISCRIMINATION

TECHNICAL FIELD

This invention relates to a tape cassette within which there is accommodated a tape body such as magnetic tape serving as recording medium for information signals or cleaning tape for cleaning head, and so forth, of a recording/reproducing apparatus.

BACKGROUND ART

Hitherto, there have been widely used tape cassettes within which there is a accommodated magnetic tape as a recording medium for video signals or information signals such as data, and so forth, processed by an information processing apparatus such as computer, and the like.

In magnetic tapes accommodated within the tape cassette, when other information signals are overwritten onto the area where information signals are recorded, information signals previously recorded are erased. As a result, information signals to be preserved are erroneously erased. In view of the above, in order to prevent such overwrite recording or erroneous erasing of information signals, there is provided a write protect mechanism at tape cassette that permits recording/reproduction of information signals.

As a write protect mechanism provided at the tape cassette, there is known a mechanism composed of a discrimination hole provided at the cassette body within which the magnetic tape accommodated, and an erroneous recording prevention member for opening and closing the above-mentioned discrimination hole. When the discrimination hole is opened, this write protect mechanism inhibits recording of information signals onto magnetic tape. On the other hand, at the recording and reproducing apparatus side into which the above-mentioned tape cassette is loaded, there is provided a detection mechanism for detecting the state of the write protect mechanism. When the tape cassette is loaded with the discrimination hole, it is discriminated that this tape cassette inhibits write operation of information signals, thus to limit write operation of information signals.

Moreover, when the tape cassette is loaded with the discrimination hole, the detection mechanism at the recording and reproducing unit side discriminates that this tape cassette and permits a write operation of information signals to allow the recording and reproducing unit side to set recording mode, whereby information signals can be recorded.

Meanwhile, in tape cassettes of this kind, there have been widely used tape cassettes within which magnetic tape having a tape width of 8 mm is accommodated. As such tape cassettes, there are provided tape cassettes used as a recording medium for a recording and reproducing unit, used as an external unit of information processing unit such as computer, and so forth, and used for exclusively recording digital data handled in the information processing unit such as computer, and so forth. There are also provided tape cassettes used as a recording medium for a video tape recorder, and used for exclusively recording analog signals such as video signals or audio signals, and so forth. Tape cassettes used for recording digital data and tape cassettes used for recording video signals or audio signals are magnetic tapes having tape width of 8 mm, and are respectively accommodated within the cassette bodies of which sizes are caused to be in correspondence with each other and substantially common in external shapes. For this reason, it is very difficult to discriminate, by visual observation, between tape cassettes used for recording digital data and tape cassettes used for recording video signals or audio signals.

Meanwhile, magnetic tapes accommodated within the tape cassette used for recording data and the tape cassettes used for recording video signals or audio signals have specifications such as magnetic media, and so forth, that is different from each other. The magnetic tape accommodated within a tape cassette for recording digital data has large recording capacity as compared to the magnetic tape accommodated within a tape cassette for recording video signals or audio signals, and is required that guarantee of error rate with respect to data to be recorded is great. For this reason, in the case where the tape cassette for recording of video signals or audio signals is erroneously loaded into recording and reproducing unit of information processing apparatus so that it is used as tape cassette for recording of data signal, there are inconveniences such that recording capacity is insufficient, so that necessary data fails to be recorded or becomes missing.

Further, in the tape cassettes used for recording digital data, there are tape cassettes having different recording formats such as the width of recording track, or the pitch of recording track, and so forth, or different recording capacities. In recording and reproducing units using such tape cassette as a recording medium, there are employed recording/reproduction systems corresponding to respective recording formats.

In the tape cassettes where recording capacity is large, track width and track pitch are small in order to permit high-density recording of data. As a result, when a tape cassette having a small track width and track pitch is loaded into a recording and reproducing unit that is normally used with a tape cassette having small recording capacity for carrying out recording of data by recording format, that has a large track width and track pitch, and write operation of data is carried out, the recording track of the large capacity tape cassette that is adjacent the recording track on which data has been already recorded is scanned by magnetic head so that data recorded on this recording track is erased. As a result, data are erroneously erased.

In addition, in the case where a tape cassette having a large recording capacity is loaded in to a recording and reproducing unit that exclusively uses tape cassettes having small recording capacity, and where a read operation of data is carried out, plural recording tracks adjacent to each other are scanned at the same time by the magnetic head, thus failing to carry out precise read operation of data.

DISCLOSURE OF THE INVENTION

An object of this invention is to provide a tape cassette that permits discrimination between tape cassettes different in specification such as recording format, and so forth, by utilizing write protect mechanism provided at the tape cassette.

Another object of this invention is to provide a tape cassette that inhibits recording of an information signal thereon when loaded into a recording and reproducing unit that is configured for cassettes of a different format, making it possible to protect the data previously-recorded on the tape cassette.

A further object of this invention is to provide a tape cassette that can provide, within a narrow region, plural write protect mechanisms functioning as discrimination means for the tape cassette.

A still further object of this invention is to provide a tape cassette that can securely change the state of the write protect mechanism while providing, within a narrow region, plural write protect mechanisms functioning as discrimination means for the tape cassette.

This invention is directed to a tape cassette in which tape body is wound across a pair of tape reels rotatably supported by the cassette body, the tape cassette including a first write protect mechanism provided in correspondence with position where there is provided a write protect mechanism provided at other tape cassette loaded with compatibility with respect to a recording/reproducing apparatus into which the tape cassette is loaded, and a second write protect mechanism provided at position that is not in correspondence with position where write protect mechanism provided at the other tape cassette is provided, wherein the first write protect mechanism is placed in write protect state at all times.

The first write protect mechanism is comprised of a discrimination hole provided at the cassette body and the second write protect mechanism comprises a discrimination hole provided at the cassette body and an erroneous recording prevention member for opening and closing the last-mentioned discrimination hole.

The erroneous recording prevention member constituting the second write protect mechanism is caused to undergo movement operation in a manner substantially perpendicular to the plane surface where discrimination hole is provided of the cassette body to open and close the discrimination hole.

A tape cassette according to this invention comprises plural first write protect mechanisms constituted by discrimination holes provided at the cassette body, and a second write protect mechanism including a discrimination hole provided at the cassette body and an erroneous recording prevention member for opening and closing the last-mentioned discrimination hole, wherein the plural discrimination holes respectively constituting the plural first write protect mechanisms and the discrimination hole constituting the second write protect mechanism are provided at the bottom surface of the cassette body in series along one side surface of the cassette body. The discrimination hole constituting the second write protect mechanism is provided between the discrimination holes constituting the first write protect mechanisms, and the erroneous recording prevention member constituting the second write protect mechanism is caused to undergo movement operation in a manner substantially perpendicular to the plane surface where the discrimination hole is provided of the cassette body.

The erroneous recording prevention member constituting the second write protect mechanism is adapted so that when it is located at the position where the discrimination hole constituting the second write protect mechanism is opened and at the position where that discrimination hole is closed, engagement portion is caused to be engaged with cassette body so that movement is limited.

At the tape cassette according to this invention, there is further provided tape discrimination mechanism for discriminating kind of tape body accommodated within the cassette body. This tape discrimination mechanism is discrimination hole provided at the cassette body.

Within the tape cassette discriminated by the tape discrimination mechanism, there is accommodated cleaning tape for cleaning head, and so forth, of the recording/reproducing unit.

Still more further objects of this invention and more practical merits or advantages obtained by this invention will become more apparent from the description of the embodiments that will be given.

BEST MODE FOR CARRYING OUT THE INVENTION

A tape cassette according to this invention will now be described with reference to the attached drawings.

This tape cassette 1 is adapted to accommodate magnetic tape having tape width of 8 mm. The tape cassette 1 is used as recording medium for an information processing apparatus such as computer, and so forth, and is caused to be of structure having sufficiently large recording capacity as compared to a tape cassette for video tape recorder used for exclusively carrying out recording of video signals or audio signals. The tape cassette 1 constituted as tape cassette for recording of data is formed in such a manner that its external shape is caused to be substantially in correspondence with that of the tape cassette for video tape recorder within which magnetic tape having tape width of 8 mm is accommodated, which is constituted as tape cassette for exclusively recording of video signals or audio signals. The tape cassette 1 and the tape cassette for video tape recorder are formed in such a manner that widths, lengths and thicknesses are common.

Figure 1:
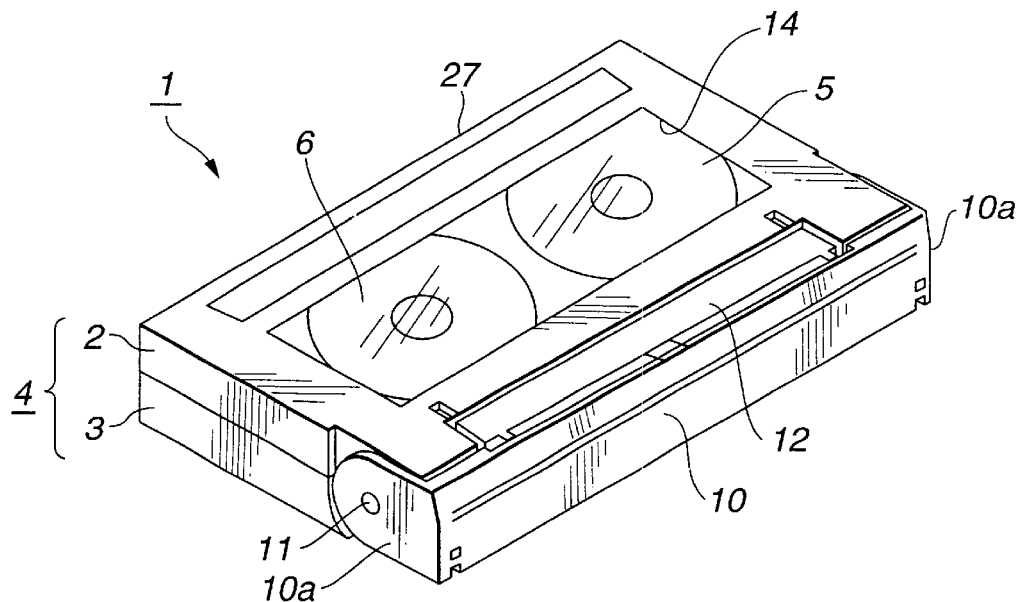
FIG. 1 is a perspective view of a tape cassette to which this invention is applied.
Figure 2:
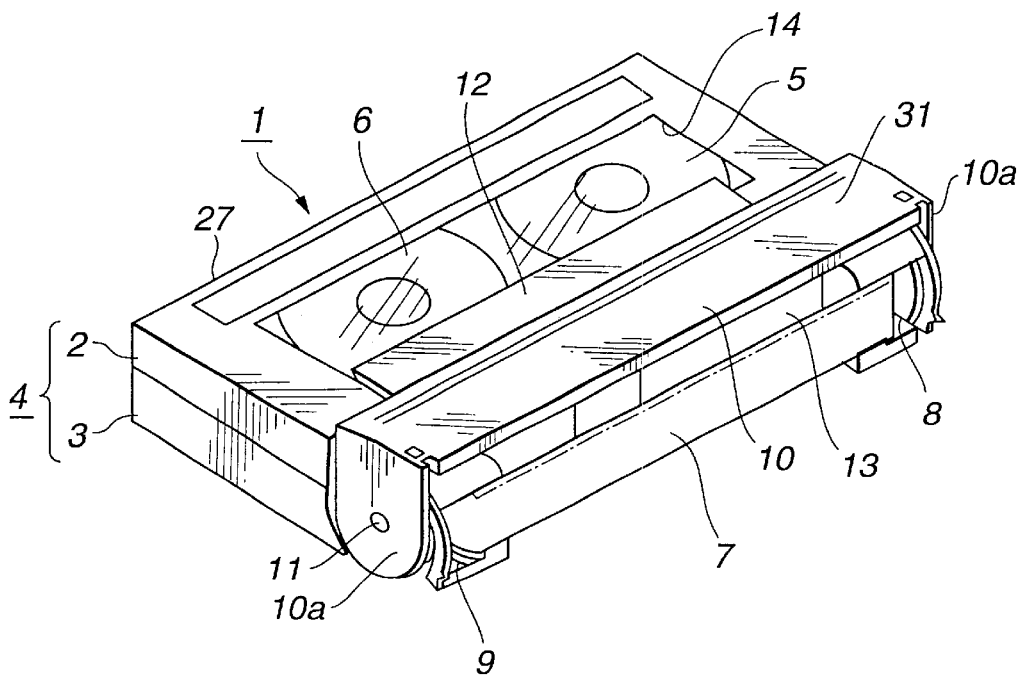
FIG. 2 is a perspective view showing the state where front cover of the tape cassette is opened.

As shown in FIGS. 1 and 2, this tape cassette 1 includes, similarly to the above-described tape cassette for video tape recorder, a cassette body 4 in which a pair of upper and lower halves 2, 3 are butt-joined, wherein a pair of tape reels 5, 6 are rotatably supported within this cassette body 4.

Across these tape reels 5, 6, a magnetic tape 7 serving as recording medium is wound. This magnetic tape 7 is capable of recording data handled in an information processing unit such as computer, and so forth, in the state where satisfactory recording is maintained so that sufficient recording capacity is provided.

As shown in FIG. 2, the magnetic tape 7 wound across a pair of tape reels 5, 6 is drawn out toward the external portion of the cassette body 4 through opening portions 8, 9 for tape drawing, which are provided at both sides of the front side of the cassette body 4, and is caused to undergo traveling operation over the pair of tape reels 5, 6.

At the front side of the cassette body 4, there is rotatably attached, a cover body 10 for covering the magnetic tape 7 that has been drawn out toward the front side of the cassette body 4. This cover body 10 is adapted so that rotational pieces 10a, 10a provided in a projected manner (hereinafter simply referred to as "projected" as occasion may demand) such that they are opposed to each other at both sides and are caused to be pivotally supported at both sides of the front side of the cassette body 4 through supporting pins 11. They undergo rotational operation between the position shown in FIG. 1 where the front side of the cassette body 4 is closed and the position shown in FIG. 2 where the front side is opened with the supporting pins 11 being as center. Further, the cover body 10 is subjected to rotational operation to thereby open or close the front side of the cassette body 4. In this example, at the cover body 10, an upper cover 12 for covering a portion of the upper surface side of the cassette body 4 is attached so that it is synchronously rotated.

Figure 3:
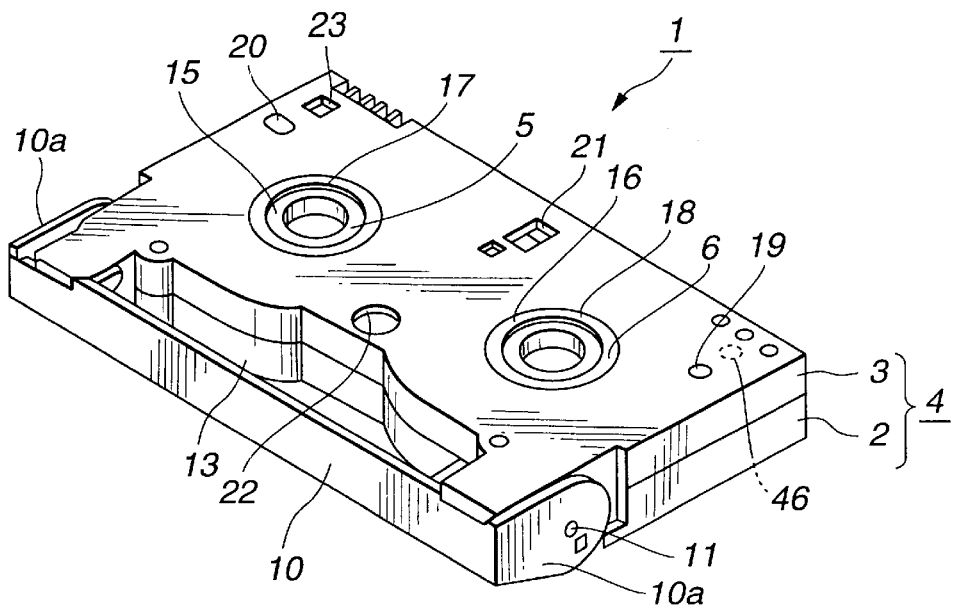
FIG. 3 is a perspective view showing bottom surface side of the tape cassette.

As shown in FIG. 3, at the front side covered by the cover body 10 of the cassette body 4, there is provided a recessed portion 13 into which there is admitted a loading mechanism for drawing the magnetic tape 7 from the cassette body 4 to carry out loading thereof with respect to tape traveling path within recording/reproducing unit into which tape cassette 1 is loaded.

At the upper surface side of the cassette body 4, there is provided a rectangular see-through window that permits visual observation of the state of the magnetic tape 7 wound across a pair of reels 5, 6.

Moreover, at the bottom surface side of the cassette body 4, as shown in FIG. 3, there are provided reel drive shaft penetration holes 17, 18 facing, toward the external, hub portions 15, 16 provided at the central portion of the tape reels 5, 6 and through which there are penetrated reel drive shafts engaged with the hub portions 15, 16 to allow the tape reels 5, 6 to undergo rotational operation. Further, at the bottom surface side of the cassette body 4 and at both sides of the rear side opposite to the front side where the cover body 10 is attached, there are provided positioning holes 19, 20 adapted so that when this tape cassette 1 is loaded with respect to the recording/reproducing unit, positioning pins provided at this recording/reproducing unit side are engaged therewith to carry out positioning of loading position. Further, as shown in FIG. 3, at the bottom surface side of the cassette body 4, there is provided a reel lock member operation hole 21 to which there is faced the operation portion of reel lock member positioned at the central portion of the back side to limit free rotation of tape reels 5, 6. When the tape cassette 1 is loaded with respect to the recording/reproducing unit, reel lock releasing member provided at the recording/reproducing unit side is admitted into the above-mentioned reel lock member operation hole 21 to allow the reel lock member to undergo movement operation to thereby release lock state of the tape reels 5, 6. Furthermore, as shown in FIG. 3, at the bottom surface side of the cassette body 4, a light emitting element insertion hole 22 is positioned at the central portion of the front side and adapted so that light emitting element is inserted through the light emitting element insertion hole 22, the light emitting element constituting terminal end detecting mechanism for detecting terminating end of the magnetic tape 7 provided at the recording/reproducing unit side.

In addition, at the bottom surface side of the cassette body 4 and at the other corner portion of the back side close to the other positioning hole 20, as shown in FIG. 3, there is provided a tape kind discrimination hole 23. The tape kind discrimination hole 23 indicates that this tape cassette 1 is a tape cassette for recording data which is handled in the information processing unit such as computer, and so forth.

Figure 4:
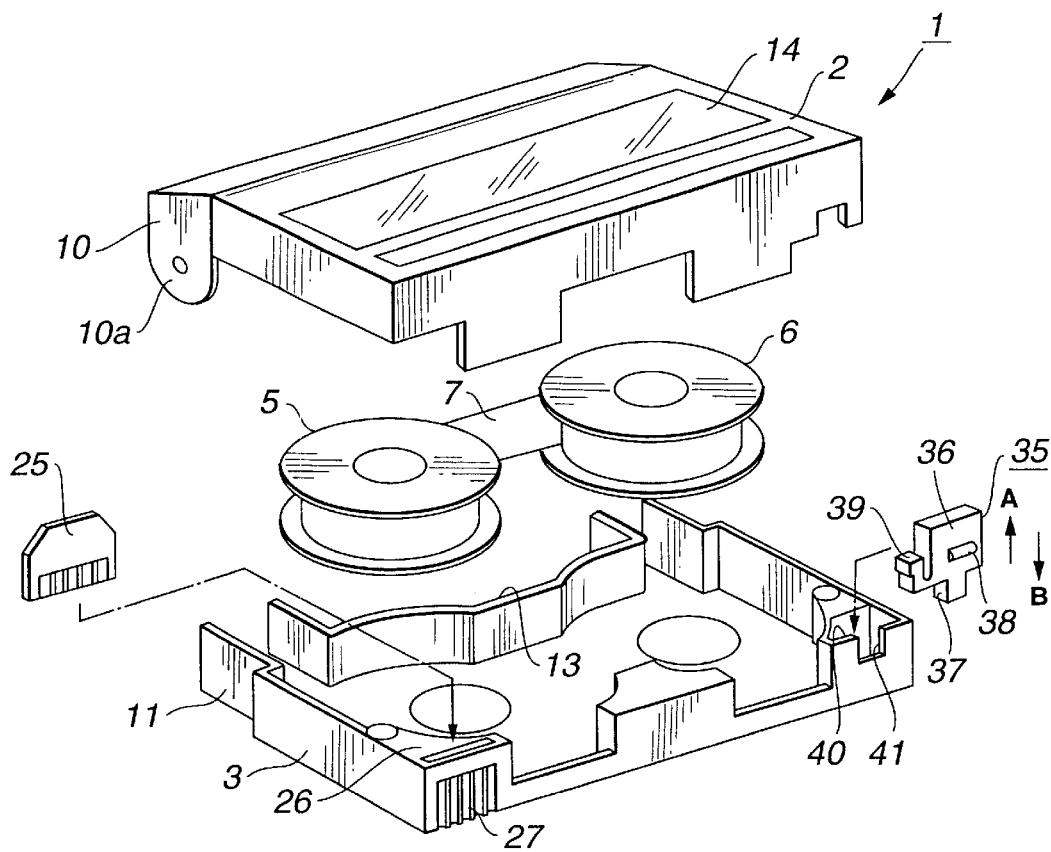
FIG. 4 is an exploded perspective view of the tape cassette.

Shown in FIG. 4, is an auxiliary recording medium 25 disposed within the cassette body 4 of the tape cassette 1. The tape cassette 1 may be used as tape cassette for recording data. The auxiliary recording medium 25 is provided with a memory and a transmit/receive section. The memory may include recorded magnetic tape information such as specification, use state, recording position, recorded content of information signal and/or the number of recording or reproduction times of the magnetic tape 7.

The auxiliary memory medium 25 is disposed at the other corner portion side of the lower half 3 in which discrimination hole 23 is provided and along the inner side surface of the rear face wall of this lower half 3. At the inner side surface of this rear face wall, there is provided an insertion groove 26 for attaching the auxiliary memory medium 25. The auxiliary memory medium 25 is attached within the cassette body 4 through this insertion groove 26. The auxiliary memory medium 25 disposed within the cassette body 4 is opposed to an auxiliary recording/reproducing unit provided at the recording/reproducing apparatus side through opening portions 27 provided at the rear face wall of the cassette body 4.

Figure 5:
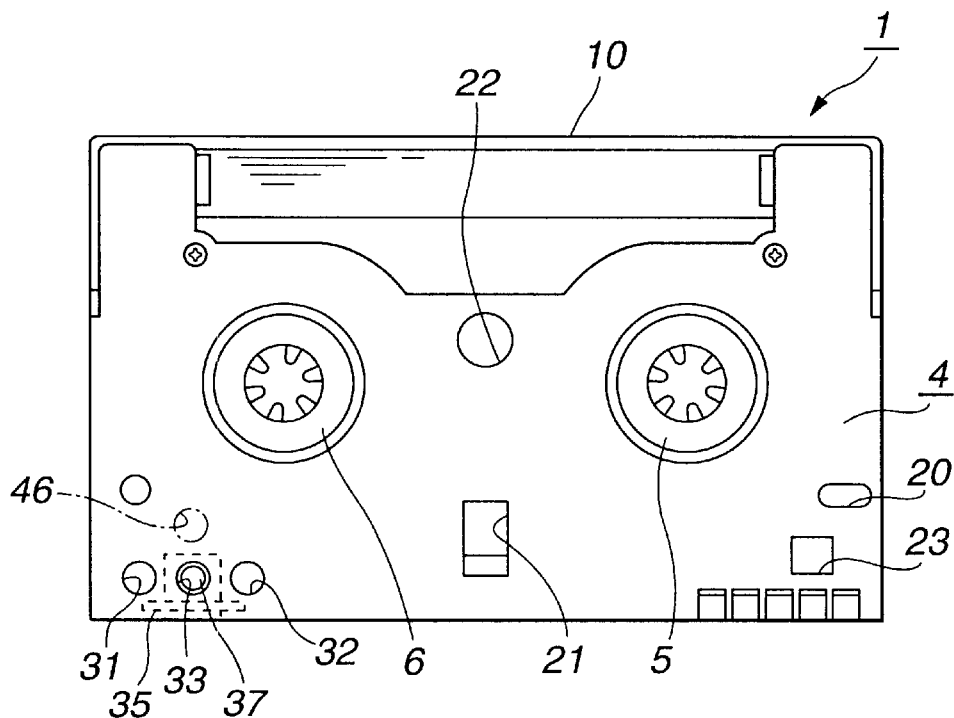
FIG. 5 is a bottom view showing first and second write protect mechanisms provided at the bottom surface side of tape cassette.

Meanwhile, the tape cassette 1 according to this invention is adapted so that, as shown in FIGS. 3 and 5, there are provided discrimination holes 31, 32 respectively constituting two first write protect mechanisms at the bottom face side of the cassette body 4 and in the state positioned at one corner portion of the rear face side where one positioning hole 19 is provided. Further, at the bottom face side of the cassette body 4, there is provided a discrimination hole 33 positioned between these discrimination holes 31, 32 to constitute second write protect mechanism. The two discrimination holes 31, 32 constituting the first write protect mechanism and the discrimination hole 33 constituting the second write protect mechanism are provided, as shown in FIG. 5, at the bottom surface of the cassette body 4 in series along the rear face of the cassette body 4 in the state close to each other.

The discrimination hole 31 constituting one first write protect mechanism, which is positioned at the side closest to the corner portion of the cassette body 4, is provided at the position corresponding to a discrimination hole constituting a write protect mechanism provided at a tape cassette for video tape recorder used as tape cassette for exclusively recording video signals or audio signals. Moreover, the discrimination hole 32 constituting the other first write protect mechanism is provided at the position corresponding to a discrimination hole constituting a write protect mechanism provided at a tape cassette for recording/reproduction of data handled by an information processing unit such as computer, and so forth, and within which there is accommodated magnetic tape of low capacity type having low recording capacity different in the recording format such as width of recording track and/or pitch of recording track, and so forth, from those of the magnetic tape 7 accommodated within the tape cassette 1 according to this invention.

The state of write protect mechanism is detected when plural kinds of tape cassettes different in the recording format and having substantially common outer shapes are adapted so that the write protect mechanisms for each of the tape cassettes are provided at common position and the width of the magnetic tape is accommodated to be common in the state, and when tape cassette of another recording format is loaded into the recording/reproducing unit corresponding to a specific recording format.

For example, when a tape cassette of a high density type according to this invention, in which the track width and the track pitch are caused to be small so that high density recording is realized, is placed in the state where recording of data can be made, and is loaded into a recording/reproducing unit that uses a tape cassette of low density having low recording capacity for carrying out recording of data by recording format in which track width and track pitch are large, there results the state where write operation of data can be made.

The recording track adjacent to the recording track in which data has been already recorded is scanned by the magnetic head, and data recorded on this recording track may be erased. In order to prevent this problem in a tape cassette different in the recording format that has a substantially common outer shape and magnetic tapes width, it is required that there results the state where recording of data, and so forth, is inhibited in the case where the tape cassette of the high density type is loaded into a recording/reproducing unit that uses a tape cassette of the low density type or is loaded into video tape recorder that uses a tape cassette for recording video signals or audio signals.

Similarly, also in the case where tape cassette of the low density type for data recording is loaded into a video tape recorder is used as a tape cassette for recording video signals or audio signals, it is required that there results the state where recording of video signals, and so forth, is inhibited.

In view of the above, in the tape cassette 1 according to this invention, as described above, discrimination holes 31, 32 constituting the respective first write protect mechanisms are provided in correspondence with the position where there is provided write protect mechanism provided for the tape cassette of video tape recorder and for the tape cassette of the low capacity type.

The write protect mechanism provided in the tape cassettes of this kind is adapted so that when the discrimination hole constituting write protect mechanism is in an opened state, write operation of data, and so forth, is inhibited, and when the discrimination hole is in a closed state, write operation of data, and so forth, can be made.

The tape cassette 1 according to this invention is formed so that discrimination holes 31, 32 constituting the first write protect mechanism are opened in an ordinary state. Namely, the discrimination holes 31, 32 are formed at the bottom surface of the cassette body 4 as merely opened holes, respectively. As stated above, the tape cassette 1 according to this invention is adapted so that discrimination holes 31, 32 constituting the first write protect mechanism are opened in ordinary state in correspondence with the position where the write protect mechanism of the tape cassette for video tape recorder or where the write protect mechanism of the tape cassette of the low capacity type is provided, and is thus placed in the state where write operation of data, and so forth, is inhibited.

Accordingly, in the case where the tape cassette is loaded into the recording/reproducing unit that uses a tape cassette of the low density type or is loaded into the video tape recorder, erroneously written data, etc are inhibited, and protection of already recorded data can be realized.

Further, the second write protect mechanism serves to set whether or not recording of data with respect to tape cassette of the high density type can be made, and is provided with an erroneous recording prevention member 35 constituted by molding synthetic resin, which serves to open and close the discrimination hole 33.

Figure 6:
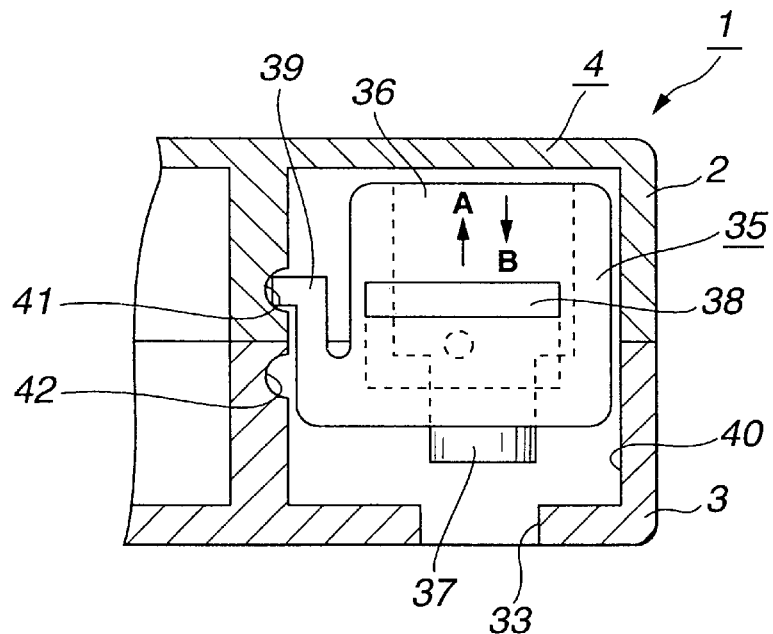
FIG. 6 is a cross sectional view showing second write protect mechanism provided at tape cassette and showing the state where discrimination hole is opened so that write operation of data is inhibited.
Figure 7:
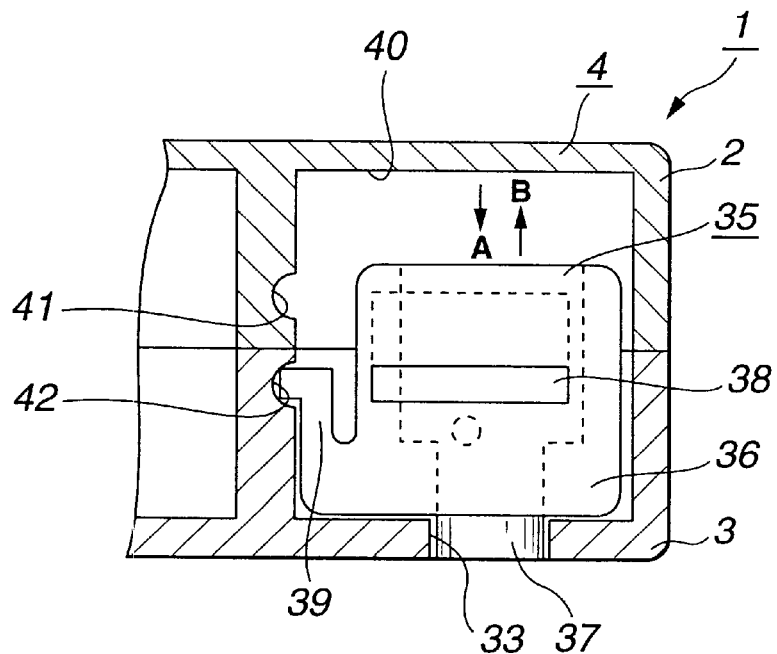
FIG. 7 is a cross sectional view of tape cassette showing the state where discrimination hole constituting second write protect mechanism is closed so that write operation of data is enabled.

As shown in FIG. 4, the erroneous recording prevention member 35 includes a movement portion 36 and a discrimination hole opening/closing portion 37 that is provided integrally with this movement portion 36 and is moved along with the movement portion 36 to open and close the discrimination hole 33. At the plane surface of the movement portion 36, there is provided an operation piece 38 for allowing this movement portion 36 to undergo movement operation. At one side surface thereof, there is provided an engagement piece 39 that can be subjected to elastic displacement. As shown in FIGS. 6 and 7, this erroneous recording prevention member 35 is adapted to accommodate the movement portion 36 within an accommodating portion 40 provided at the rear face wall side of the cassette body 4 and is movably attached in a direction indicated by arrow A and in a direction indicated by arrow B in FIGS. 4, 6 and 7 that are directions substantially perpendicular to the bottom surface of the cassette body 4 in which discrimination hole 33 is provided, which is thickness direction of the cassette body 4. At this time, the erroneous recording prevention member 35 is adapted so that discrimination hole opening/closing portion 37 is opposed to the discrimination hole 33 and the operation piece 38 is attached at the cassette body 4 in a manner facing toward the external of the cassette body 4 through an opening portion 41 provided at the rear face wall of the cassette body 4.

The erroneous recording prevention member 35 is adapted so that when it is operated to move in the direction indicated by arrow A in FIGS. 4, 6 and 7 through the operation piece 38, it is moved in the direction where the discrimination hole opening/closing portion 37 opens the discrimination hole 33, and when it is operated to move in the direction indicated by arrow B in FIGS. 4, 6 and 7, it is moved in the direction where the discrimination hole opening/closing portion 37 is engaged with the discrimination hole 33 so that the portion 37 closes the discrimination hole 33. In this tape cassette 1, when the discrimination hole 33 is opened, there results the state where write operation with respect to the magnetic tape 7 of data is inhibited, while when the discrimination hole 33 is closed, there results the state where write operation with respect to magnetic tape 7 of data can be made.

On the other hand, at the inner circumstantial surface of the accommodating portion 40 provided at the cassette body 4 side, there are provided first and second engagement recessed portions 41, 42 with which engagement piece 39 is engaged when the erroneous recording prevention member 35 is moved to the position where the discrimination hole 33 is opened as shown in FIG. 6, and when it is moved to the position where the discrimination hole 33 is closed as shown in FIG. 7 to hold the erroneous recording prevention member 35 at the position where the discrimination hole 33 is opened and at the position where the discrimination hole 33 is closed. When the erroneous recording prevention member 35 is moved to the position where the discrimination hole 33 is opened and the position where it is closed, the engagement piece 39 is engaged with the first or second engagement recessed portion 41 or 42 so that it is held at each position, thereby making it possible to securely hold the tape cassette 1 in the write protect state or in the write enable state.

Figure 8:
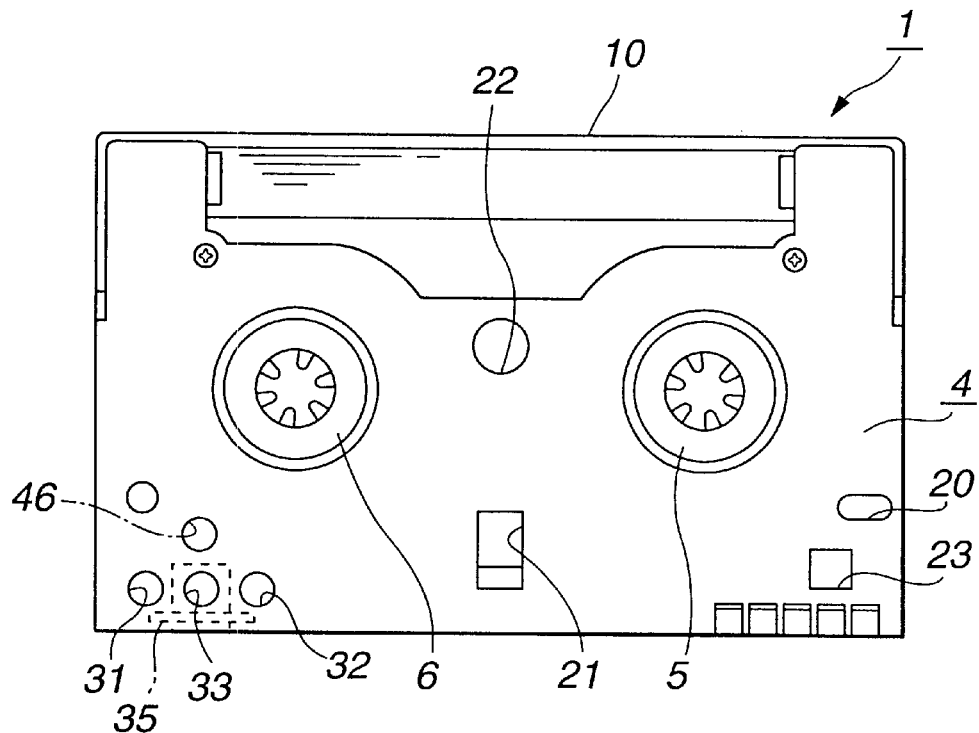
FIG. 8 is a bottom view showing tape cassette within which cleaning tape is accommodated.

While the above-described tape cassette 1 is adapted to accommodate the magnetic tape 7 within so that a write operation of data can be made, also used is a tape cassette 45 within which there is accommodated cleaning tape for cleaning head, and so forth, of recording/reproducing unit into which this tape cassette 1 is loaded. In the tape cassette 45 within which cleaning tape is accommodated, as shown in FIG. 8, there is further provided a cleaning tape discrimination hole 46 in order to discriminate between this tape cassette 45 and the tape cassette 1 within which the magnetic tape 7 is accommodated. This discrimination hole 46 is provided at the position in the vicinity of the discrimination holes 31, 32 constituting the first write protect mechanism and the discrimination hole 33 constituting the second write protect mechanism, and at the internal side of the cassette body 4. The cleaning tape discrimination hole 46 provided at the tape cassette 45 within which cleaning tape is accommodated is formed to be opened in ordinary state similarly to discrimination holes 31, 32 constituting the first write protect mechanism. In this tape cassette 45, the discrimination hole 33 constituting the second write protect mechanism is also opened in ordinary state along with the discrimination holes 31, 32 constituting the first write protect mechanism. Accordingly, at the second write protect mechanism, there is not provided erroneous recording prevention member 35. Namely, the tape cassette 45 within which cleaning tape is accommodated is in the state where recording of data is inhibited when it is loaded with respect to the recording/reproducing unit.

In this case, in the tape cassette 1 within which magnetic tape 7 is accommodated, the portion at which cleaning tape discrimination hole 46 indicating tape cassette 45 within which cleaning tape is accommodated is provided is in closed state as shown in FIG. 5.

Accordingly, in this invention, as the result of the fact that discrimination is between open and closed states of the cleaning tape discrimination hole 46, i.e., discrimination as to whether or not cleaning tape discrimination hole 46 is provided is carried out, discrimination as to whether a corresponding tape cassette is tape cassette 1 within which the magnetic tape 7 is accommodated or tape cassette 45 within which cleaning tape is accommodated is carried out.

Recording/reproducing apparatus using tape cassette 1 according to this invention will now be described.

This recording/reproducing unit 51 is used for recording/reproducing digital data handled in information processing unit such as computer, and so forth, and can use tape cassette of the low density type along with tape cassette 1 of the high density type according to this invention.

Figure 9:
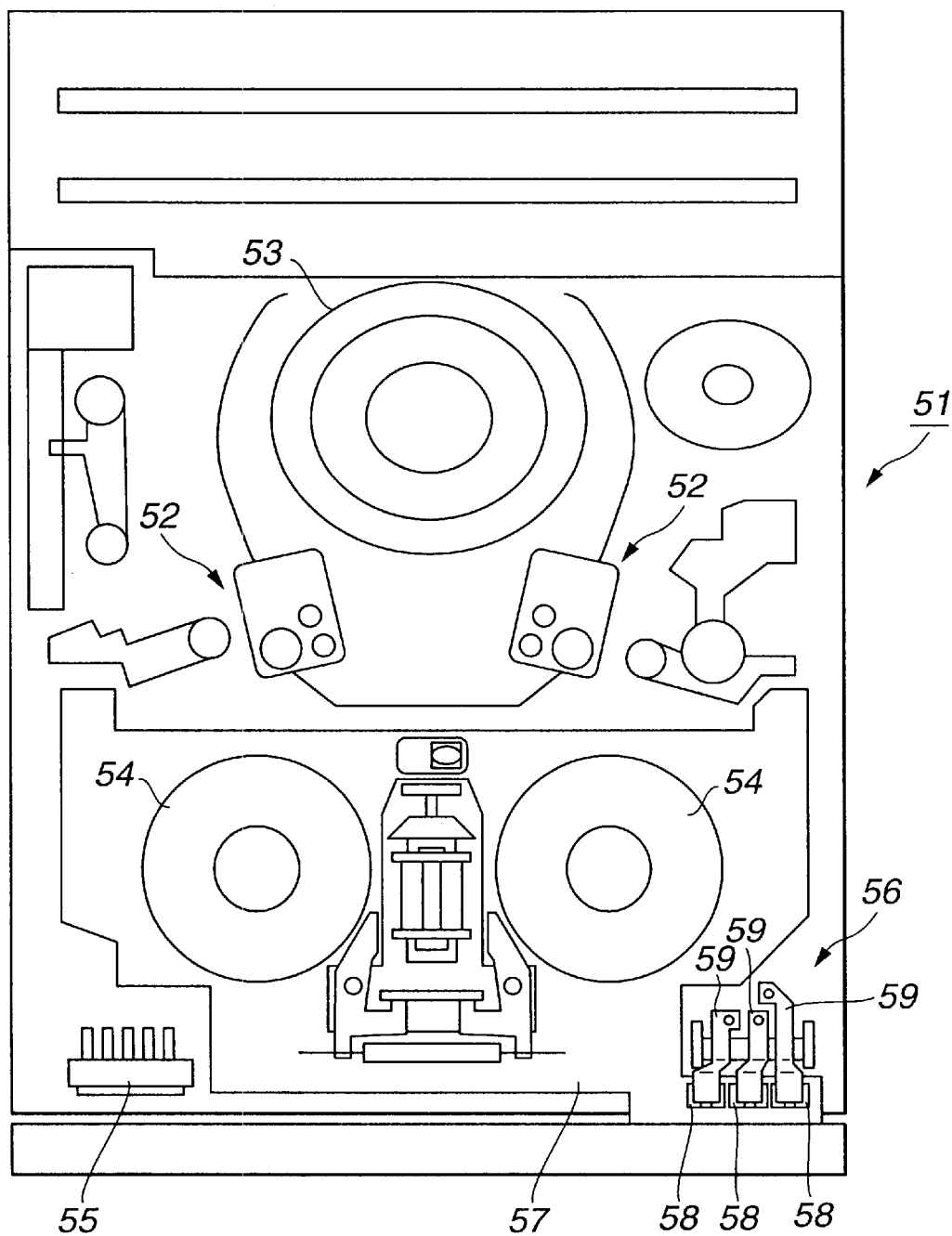
FIG. 9 is a plan view showing a recording/reproducing apparatus in which tape cassette according to this invention is used.

As shown in FIG. 9, the recording/reproducing unit 51 comprises tape guide systems 52 for carrying out guide so that magnetic tape 7 accommodated within tape cassette 1 travels along a predetermined tape traveling path, a rotational magnetic head unit 53 comprising magnetic head for carrying out write operation of data with respect to the magnetic tape 7 or carrying out read operation of data recorded on the magnetic tape 7, tape real mechanisms 54 for allowing a pair of tape reels 5, 6 provided within the tape cassette 1 to undergo rotational operation to carry out winding operation of magnetic tape 7 that is caused to undergo traveling operation, and an auxiliary recording/reproducing unit 55 for writing, with respect to auxiliary memory medium 25 provided at the tape cassette 1, magnetic tape information which are various information such as specification, use state, recording position or content of recorded information signal, and/or the times of recording or reproduction operations of the magnetic tape 7, or for reading, with respect thereto, magnetic tape information recorded at the auxiliary memory medium 25, and the like wherein there are further provided a discrimination hole detecting mechanism 56 for detecting discrimination holes 31, 32 constituting the first write protect mechanism, discrimination hole 33 constituting the second write protect mechanism, and cleaning tape discrimination hole 46 indicating that tape body accommodated within tape cassette is cleaning tape.

The auxiliary recording/reproducing unit 55 is operative so as to become close to the auxiliary memory medium 25 when the tape cassette 1 is loaded into the recording/reproducing unit 51 to carry out write or read operation of magnetic tape information recorded at the auxiliary memory medium 25.

The discrimination hole detection mechanism 56 detects the states of discrimination hole 32 constituting first write protect mechanism, discrimination hole 33 constituting a second write protect mechanism and a cleaning tape discrimination hole 46 accommodated within the tape cassette, i.e., detects whether the respective discrimination holes 32, 33, 46 are in the opened state or in the closed state, thus to discriminate whether or not loaded tape cassette is a data-writable tape cassette.

In this example, the recording/reproducing unit 51 serves to carry out discrimination as to whether a loaded tape cassette is a tape cassette for recording data handled in information processing unit, or a tape cassette for a video tape recorder used for exclusively carrying out recording of video signals or audio signals by detecting the presence or absence of tape kind discrimination hole 23 provided at the position different from the positions where discrimination holes 32, 33, 46 are provided. When tape cassette for the video tape recorder is loaded, e.g., an eject operation is automatically carried out without starting loading with respect to tape traveling path of the magnetic tape. Accordingly, there is not provided detection mechanism for detecting the state of the discrimination hole 31 constituting the first write protect mechanism provided at the position corresponding to the write protect mechanism provided at the tape cassette for video tape recorder.

As shown in FIG. 9, the discrimination hole detection mechanism 56 for detecting states of the respective discrimination holes 32, 33, 46 comprises sensors 58, each provided with light emitting, light receiving and detection operational elements 59 in correspondence with respective discrimination holes 32, 33, 46. The discrimination hole detection mechanism 56 is disposed on a base 57 where mechanism portions such as tape reel mechanisms 54, etc are provided.

Rotations of the respective detection operational elements 59 are controlled by the open or closed states of the respective discrimination holes 32, 33, 46 provided at the tape cassette 1 loaded with respect to this recording/reproducing apparatus 51. Thus, presence and absence of those rotations are detected by respective sensors 58, whereby presence and absence of open or closed states of respective discrimination holes 32, 33, 46 are detected.

In this example, in the tape cassette 1 according to this invention, discrimination hole 32 constituting the first write protect mechanism provided at the position corresponding to write protect mechanism provided at the tape cassette of the low capacity type is opened in ordinary state. Accordingly, the detection operational element 59 for detecting the state of this discrimination hole 32 is maintained in initial state without being caused to undergo rotational operation by loading of the tape cassette 1. Moreover, since the portion where the cleaning tape discrimination hole 46 is provided is placed in closed state, the detection operational element 59 for detecting the state of the cleaning tape discrimination hole 46 is caused to undergo rotational operation by loading of the tape cassette 1. The sensor 58 detects when the operational element 59 undergoes a rotational operation. When such state is detected, it is discriminated that the tape cassette 1 loaded into the recording/reproducing unit 51 is of the high density type.

Figure 11:
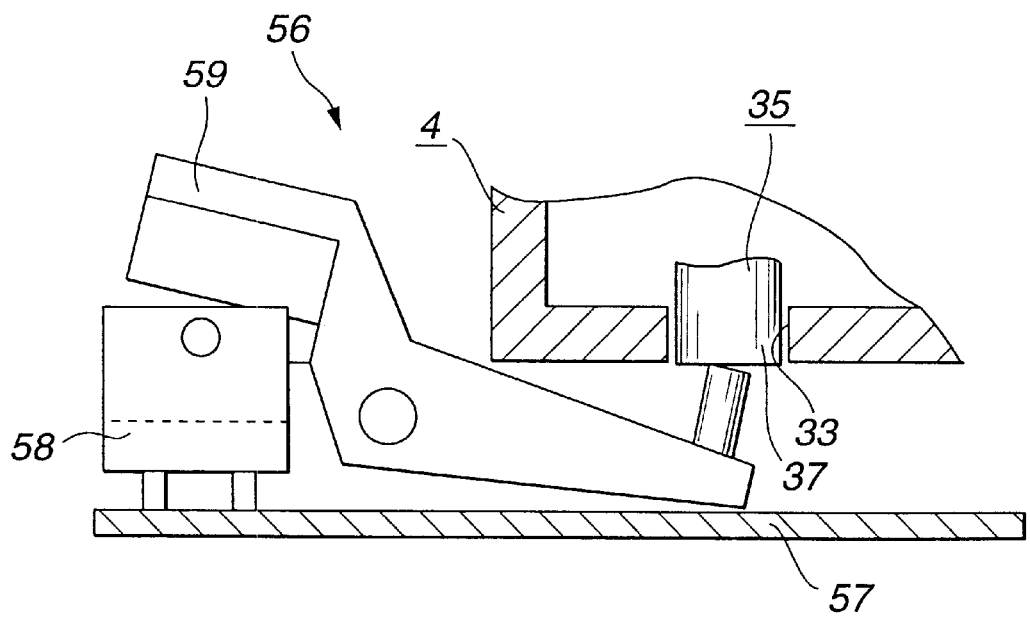
FIG. 11 is a side view showing discrimination hole detecting mechanism when the discrimination hole is in write enable state.

In this case, as the result of the fact that presence or absence of open or closed state of discrimination hole 33 constituting the second write protect mechanism is detected by the discrimination hole detection mechanism 56, whether or not the loaded tape cassette 1 is a tape cassette which permits write operation of data is discriminated. As shown in FIG. 11, in the tape cassette 1 that permits write operation of data, there results where discrimination hole 33 constituting the second write protect mechanism is closed by discrimination hole opening/closing portion 37 of the erroneous recording prevention member 35. In the case where the discrimination hole 33 is closed when tape cassette 1 is loaded into the recording/reproducing unit 51, the detection operational element 59 is caused to undergo rotational operation by the discrimination hole opening/closing portion 37 for closing the discrimination hole 33. When the sensor 58 detects that the detection operational element 59 has undergone a rotational operation, the recording/reproducing unit 51 discriminates that the loaded tape cassette is a tape cassette that permits recording of data. As the result of the fact that the recording/reproducing unit is set to write mode of data, write operation of data is carried out with respect to the magnetic tape 7.

Figure 10:
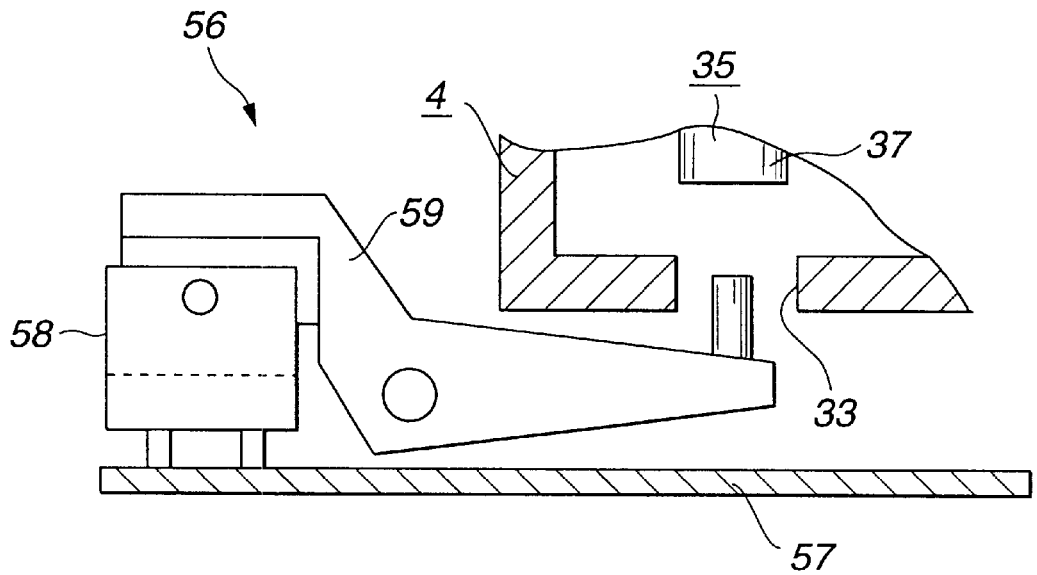
FIG. 10 is a side view showing discrimination hole detecting mechanism for detecting discrimination hole provided at tape cassette, wherein the discrimination hole is in write protect state.

Moreover, when erroneous recording prevention member 35 is moved into the cassette body 4 as shown in FIG. 6 so that the discrimination hole 33 constituting the second write protect mechanism is opened, the detection operational element 59 that is maintained at the initial position without being rotated is detected by the sensor 58, as shown in FIG. 10. Thus, the recording/reproducing unit 51 discriminates that the loaded tape cassette 1 is a tape cassette that inhibits recording of data. In the case where the discrimination hole 33 is opened and tape cassette 1 is loaded, a write operation of writing data is limited in the recording/reproducing unit 51. Thus, a write operation of writing data onto the magnetic tape 7 is limited.

Meanwhile, since the tape cassette 1 according to this invention is adapted as described above so that discrimination holes 31, 32 constituting the first write protect mechanism provided in correspondence with the position where there is provided write protect mechanisms provided at the tape cassette for video tape recorder and the tape cassette of the low capacity type are opened in ordinary state, when the tape cassette is loaded into the video tape recorder or the recording/reproducing unit using tape cassette of the low capacity type, it is discriminated by the discrimination hole detection mechanism provided at such unit side that corresponding tape cassette is tape cassette in which write operation of data is inhibited. As a result, in the case where the tape cassette 1 according to this invention is loaded with respect to the video tape recorder or the recording/reproducing unit using tape cassette of the low capacity type, it is inhibited at all times that write operation of data is carried out. Thus, it is prevented that data recorded by the recording format of high density recording is erased.

Further, in the tape cassette 45 within which the cleaning tape is accommodated, opened cleaning tape discrimination hole 46 is provided as described above. In the case where this tape cassette 45 is loaded into the above-described recording/reproducing unit 51, it is detected by the detection sensor 58 that the detection operational element 59 of the discrimination hole detection mechanism 56 provided in correspondence with this cleaning tape discrimination hole 46 is maintained at initial position without being rotated. Thus, it is detected that loaded tape cassette 45 is a tape cassette within which cleaning tape is accommodated.

When it is detected that the tape cassette 45 within which the cleaning tape is accommodated is loaded, setting of cleaning mode can be made in the recording/reproducing unit 51, thus making it possible to carry out cleaning of head, and so forth.

Since the tape cassette 45 within which the cleaning tape is accommodated is adapted so that the discrimination holes 31, 32 constituting the first write protect mechanism and the discrimination hole 33 constituting the second write protect mechanism are opened in ordinary state, it is limited that recording/reproducing unit into which this tape cassette 45 is loaded is set to recording mode for writing data. Accordingly, in the case where tape cassette 45 within which the cleaning tape is accommodated is loaded, such an erroneous operation to select a recording mode to carry out write operation of data can be prevented.

As stated above, the tape cassette 45 within which the cleaning tape is accommodated indicates that cleaning of head, and so forth, of the recording/reproducing unit can be carried out by opened cleaning tape discrimination hole 46 and discrimination holes 31, 32, 33 constituting first and second write protect mechanisms which are opened in ordinary state.

Meanwhile, in the tape cassette 45 for cleaning, it is desirable to select a tape cassette having optimum characteristics such as the material, surface roughness and thickness, and so forth, of cleaning tape in correspondence with the shape, the material and characteristic, and so forth, of the magnetic head to which cleaning is applied. Further, even in the case of cleaning tape optimum for magnetic head, which is formed so as to have specific shape and is formed by using a specific material and has specific characteristics, there are instances where such a cleaning tape is harmful to the magnetic head having another shape, material and characteristic.

In view of the above, in the above-described tape cassette within which a cleaning tape is accommodated, by combination of the opened cleaning tape discrimination hole 46 and the open and closed states of discrimination holes 31, 32, 33 constituting first and second write protect mechanisms, a cleaning tape accommodated within the tape cassette 45 is discriminated. Thus, it becomes possible to carry out, by optimum cleaning tape, cleaning of magnetic heads having shapes, materials and characteristics different from each other. In this case, discrimination of eight kinds of cleaning tapes can be made by combination of the cleaning tape discrimination hole 46 and three discrimination holes 31, 32, 33.

In this instance, discrimination hole detection mechanism 56 provided at the recording/reproducing unit 51 side into which tape cassette 45 within which cleaning tape is accommodated is loaded is used as cleaning tape detection mechanism. In this recording/reproducing unit 51, when tape cassette 45 within which cleaning tape is accommodated is loaded, a cleaning tape discrimination hole 46 is detected by discrimination hole detection mechanism 56. When this discrimination hole 46 is detected, detection function is switched so as to allow the discrimination hole detection mechanism 56 to function as cleaning tape detection mechanism.

Figure 12:
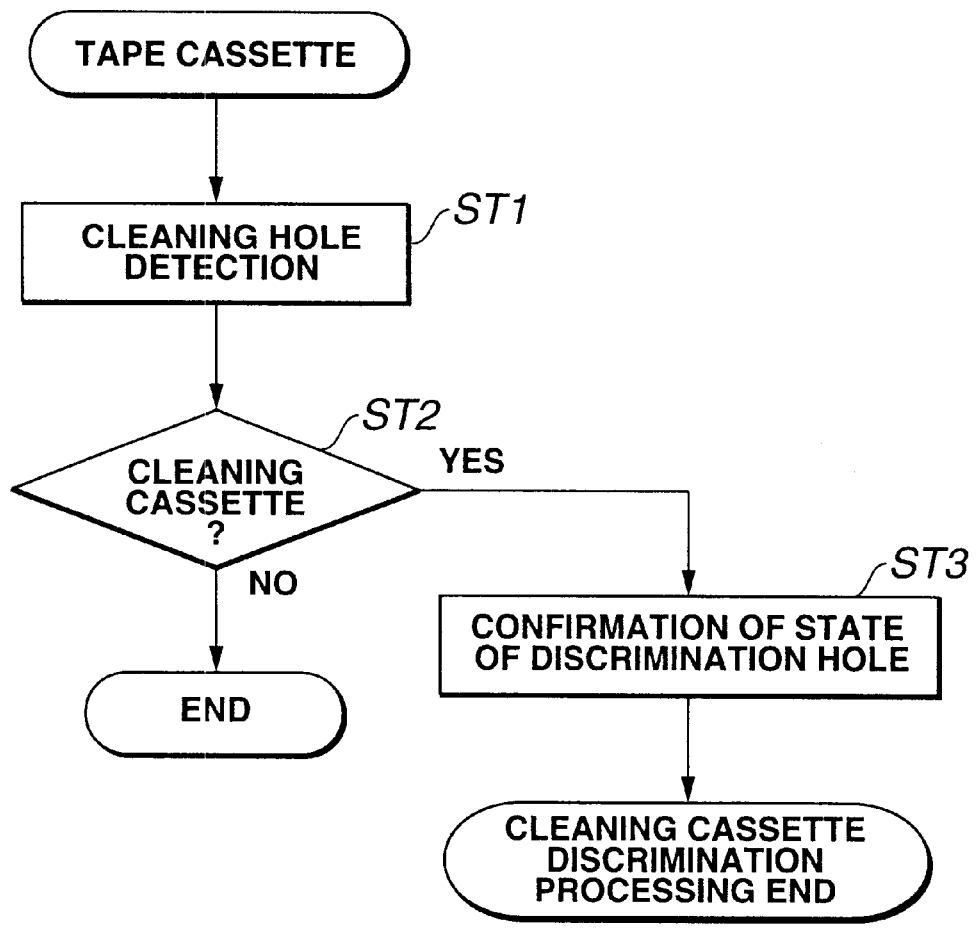
FIG. 12 is a flowchart showing the procedure to detect discrimination hole provided at tape cassette to discriminate kind of tape body accommodated within tape cassette.

The procedure for discriminating kind of cleaning tape when tape cassette 45 within which cleaning tape is accommodated is loaded with respect to the recording/reproducing unit 51 will now be described with reference to FIG. 12. When tape cassette 1 or 45 is loaded, detection operation of cleaning tape discrimination hole 46 is carried out at step 1 (ST1) and presence or absence of the cleaning tape discrimination hole 46 is detected at step 2 (ST2). In this case, when no detection of discrimination hole 46 is carried out in the state where cleaning tape discrimination hole 46 is closed, it is judged that loaded tape cassette is not tape cassette 45 within which cleaning tape is accommodated but tape cassette 1 within which magnetic tape is accommodated. Thus, the processing is completed.

When cleaning tape discrimination hole 46 is detected at step 2 (ST2), the processing proceeds to step 3 (ST3), at which detections of three discrimination holes 31, 32, 33 are carried out, thus to discriminate kind of cleaning tape accommodated within the tape cassette 45. In this case, when it is discriminated that the corresponding tape cassette is tape cassette 45 within which cleaning tape in conformity with cleaning is accommodated, cleaning of the magnetic head, and so forth, of the recording/reproducing unit 51 is started.

At this time, the recording/reproducing unit 51 is caused to be of structure such that when it is discriminated that corresponding tape is cleaning tape which is not in conformity with cleaning of the magnetic head of this unit, eject operation of the tape cassette 45 is carried out without starting cleaning, thereby making it possible to carry out cleaning of the magnetic head, and so forth, by using suitable cleaning tape at all times.

In addition, by using three discrimination holes 31, 32, 33 as discrimination holes of the accommodated cleaning tape, it is possible to constitute tape cassette 45 within which there is accommodated cleaning tape most suitable for a magnetic head formed so as to have a specific shape, formed by using a specific material and having specific characteristics. Thus, it becomes possible to carry out cleaning by using cleaning tapes optimum for respective magnetic heads.

Industrial Applicability

The tape cassette according to this invention includes first write protect mechanism provided in correspondence with the position where there is provided write protect mechanism provided at other tape cassette loaded with compatibility with respect to recording/reproducing unit into which the tape cassette is loaded and second write protect mechanism provided at the position which is not in correspondence with the position where the write protect mechanism provided at other tape cassette is provided. Since the first write protect mechanism is in the write protect state at all times, when a tape cassette where recording of information signals is carried out by other recording format is loaded into a recording/reproducing unit which corresponds to only a tape cassette of a specific recording format of tape cassettes different in the recording format, recording of information signals with respect to this tape cassette is inhibited, thus making it possible to realize protection of already recorded data.

What is claimed is:

1. A tape cassette in which a tape body is wound across a pair of tape reels rotatably supported by the cassette body, the tape cassette including:

a first write inhibit mechanism, said first write inhibit mechanism being at a location on said tape body corresponding to a write inhibit mechanism of another tape cassette, said another tape cassette being structurally adapted for loading into a recording/reproducing unit into which the tape cassette can be loaded; and a second write inhibit mechanism, said second write inhibit mechanism being at a different location on said tape body, said different location not corresponding to the write inhibit mechanism of the another tape cassette, wherein the first write inhibit mechanism is normally in a write inhibit state, for a high density recording tape cassette to permit distinction between the high density recording tape cassette and the low density recording cassette, wherein the tape cassette is further provided with a tape discrimination mechanism for discriminating kind of the tape body accommodated within the cassette body, wherein plural write inhibit mechanisms are provided as the first write inhibit mechanism, and wherein the tape body accommodated within the cassette body is cleaning tape for carrying out cleaning of a portion of the recording/reproducing apparatus.

2. The tape cassette as set forth in claim 1, wherein said plural write inhibit mechanisms enable discrimination between different sorts of the cleaning cassettes in connection with a difference in such characteristics as the abrasives and a difference in the mesh of the tape.

3. The tape cassette as set forth in claim 1, wherein said plural write inhibit mechanisms include a recognition opening for cleaning cassettes, said recognition opening having a first open/closed state for a cleaning cassette and a second open/closed state for a recording cassette.

4. A tape cassette in which a tape body is wound across a pair of tape reels rotatably supported by the cassette body, the tape cassette including:

a first write inhibit mechanism, said first write inhibit mechanism being at a location on said tape body corresponding to a write inhibit mechanism of another tape cassette, said another tape cassette being structurally adapted for loading into a recording/reproducing unit into which the tape cassette can be loaded; and a second write inhibit mechanism, said second write inhibit mechanism being at a different location on said tape body not corresponding to the write inhibit mechanism of the another tape cassette, wherein the first write inhibit mechanism is normally in write inhibit state for a high density recording tape cassette to permit distinction between the high density recording tape cassette and the low density recording cassette, wherein the tape cassette is further provided with a tape discrimination mechanism for discriminating the tape body accommodated within the cassette body, wherein plural write inhibit mechanisms are provided as the first write inhibit mechanism, and wherein the tape body accommodated within the cassette body is cleaning tape for carrying out cleaning of said recording/reproducing unit.

* * * * *